United States Patent
Hays et al.

(12) United States Patent (10) Patent No.: US 8,695,438 B2
Hays et al. (45) Date of Patent: Apr. 15, 2014

(54) METHOD AND APPARATUS FOR VIBRATING A FLOW TUBE OF A VIBRATING FLOW METER

(75) Inventors: Paul J Hays, Lafayette, CO (US); Andrew Stephen Kravitz, Erie, CO (US)

(73) Assignee: Micro Motion, Inc., Boulder, CO (US)

( * ) Notice: Subject to any disclaimer, the term of this patent is extended or adjusted under 35 U.S.C. 154(b) by 403 days.

(21) Appl. No.: 13/130,812

(22) PCT Filed: Dec. 10, 2008

(86) PCT No.: PCT/US2008/086233
§ 371 (c)(1),
(2), (4) Date: May 24, 2011

(87) PCT Pub. No.: WO2010/068202
PCT Pub. Date: Jun. 17, 2010

(65) Prior Publication Data
US 2011/0259122 A1  Oct. 27, 2011

(51) Int. Cl.
*G01F 1/84* (2006.01)
(52) U.S. Cl.
USPC .................................. 73/861.356
(58) Field of Classification Search
CPC ......................................... G01F 1/84
See application file for complete search history.

(56) References Cited

U.S. PATENT DOCUMENTS

| | | | | |
|---|---|---|---|---|
| 5,321,991 A * | 6/1994 | Kalotay | | 73/861.357 |
| 5,394,758 A * | 3/1995 | Wenger et al. | | 73/861.355 |
| 5,700,958 A * | 12/1997 | Lew et al. | | 73/861.357 |
| 6,138,517 A * | 10/2000 | Laursen et al. | | 73/861.355 |
| 6,164,140 A | 12/2000 | Kalinoski | | |
| 6,178,828 B1 * | 1/2001 | Mattar | | 73/861.357 |
| 6,230,104 B1 * | 5/2001 | Shelley et al. | | 73/861.357 |
| 6,477,902 B1 | 11/2002 | Oosawa et al. | | |
| 6,513,392 B1 * | 2/2003 | Barger et al. | | 73/861.356 |
| 6,553,845 B2 * | 4/2003 | Ohnishi et al. | | 73/861.355 |
| 6,748,813 B1 * | 6/2004 | Barger et al. | | 73/861.355 |
| 7,032,462 B2 * | 4/2006 | Barger et al. | | 73/861.355 |
| 7,168,329 B2 * | 1/2007 | Bell et al. | | 73/861.355 |
| 7,287,438 B2 * | 10/2007 | Van Cleve | | 73/861.355 |
| 2001/0045133 A1 * | 11/2001 | Ohnishi et al. | | 73/861.355 |

FOREIGN PATENT DOCUMENTS

| | | | |
|---|---|---|---|
| CA | 2559701 A1 | 10/2005 | |
| EP | 1484585 A2 | 8/2004 | |
| EP | 1719983 A1 | 8/2006 | |
| JP | 11-108723 A | 4/1999 | |
| JP | 2006514281 | 4/2006 | |
| RU | 2006136903 A | 4/2008 | |
| WO | 2004072591 A1 | 8/2004 | |

\* cited by examiner

*Primary Examiner* — Harshad R Patel
(74) *Attorney, Agent, or Firm* — The Ollila Law Group LLC (57) ABSTRACT

A flow measurement system (20) is provided according to an embodiment of the invention. The flow measurement system (20) comprises a vibrating flow meter (400) including at least one flow tube (410) and a driver (420) adapted to apply a biasing force on the flow tube (410). The flow measurement system (20) also comprises a meter electronics (450) configured to generate a drive signal to vibrate the flow tube (410) about a first deflected position (1002), wherein the first deflected position (1002) is offset from a flow tube rest position (1001).

16 Claims, 9 Drawing Sheets

METHOD AND APPARATUS FOR VIBRATING A FLOW TUBE OF A VIBRATING FLOW METER

TECHNICAL FIELD

The present invention relates to vibrating flow meters, and more particularly, to a method and apparatus for vibrating a flow tube of a vibrating flow meter.

BACKGROUND OF THE INVENTION

Flow meters are used to measure the mass flow rate, density, and other characteristics of flowing materials. The flowing material may comprise a liquid, gas, solids suspended in liquids or gas, or any combination thereof. Vibrating conduit sensors, such as Coriolis mass flow meters and vibrating densitometers typically operate by detecting motion of a vibrating conduit that contains a flowing material. Properties associated with the material in the conduit, such as mass flow, density and the like, can be determined by processing measurement signals received from motion transducers associated with the conduit. The vibration modes of the vibrating material-filled system generally are affected by the combined mass, stiffness, and damping characteristics of the containing conduit and the material contained therein.

A typical Coriolis mass flow meter includes one or more conduits that are connected inline in a pipeline or other transport system and convey material, e.g., fluids, slurries and the like, in the system. Each conduit may be viewed as having a set of natural vibration modes, including for example, simple bending, torsional, radial, lateral, and coupled modes. In a typical Coriolis mass flow measurement application, a conduit is excited in one or more vibration modes as a material flows through the conduit, and motion of the conduit is measured at points spaced along the conduit. Excitation is typically provided by an actuator, e.g., an electromechanical device, such as a voice coil-type driver, that perturbs the conduit in a periodic fashion. Mass flow rate may be determined by measuring time delay or phase differences between motions at the transducer locations. Density of the flow material can be determined from a frequency of a vibrational response of the flow meter. Two or more such transducers (or pick-off sensors) are typically employed in order to measure a vibrational response of the flow conduit or conduits and are typically located at positions upstream and downstream of the actuator. The two pick-off sensors are generally connected to electronic instrumentation by cabling, such as by two independent pairs of wires. The instrumentation receives signals from the two pick-off sensors and processes the signals in order to derive flow measurements.

In certain applications, the typical driver may not be feasible. This is particularly true in low flow applications where the weight of the magnets attached to the flow tubes becomes prohibitive. It is known from U.S. Pat. No. 7,168,329, for example to replace the magnets with a magnetic material applied to a portion of the flow tube itself. Such a system is adequate for simple driving frequencies such as sinusoidal or square wave using two or more drivers, i.e., one on each side of the flow tube. Recently however, the type of drive signal has become more complex than a simple square, trapezoidal, sinusoidal single-frequency drive signal. The complex drive signal may comprise two or more frequencies, for example. To implement advanced flow meter functions such as meter verification, speed of sound measurements, multiphase flow detection, etc., multiple frequencies are imposed on the flow tubes simultaneously resulting in a complex drive signal.

However, in order for the flow meter to obtain meaningful information, the drive force should be both bidirectional and linear. A bidirectional drive force implies that the flow tube oscillates both towards and away from the drive assembly. A linear drive force implies that the force exerted on the flow tube is nearly linearly proportional to the current/voltage applied to the coil. Such a drive force may not be a problem in typical driver assemblies, however, in implementations such as disclosed in the '329 patent, the flow meter can only operate in either a pull-mode or a push-mode. Therefore, to obtain a bidirectional drive force, multiple drive coils are required, one on each side of the flow tube. This configuration requires an excessive number of parts, which can be costly.

In addition, the drive force should be nearly linear. Although most vibratory flow meters are built with a linear drive system, some flow meters, such as the flow meters mentioned in the '329 patent lack a linear drive signal and therefore, generally cannot support complex drive signals. One approach to address the linearity problem would be to increase the size and strength of the magnetic coil.

To address the unidirectional problem mentioned in the '329 patent, multiple coils can be used, or alternatively, a hard magnetic substance including a north/south field can be applied to the flow tube. These solutions are expensive and may be prohibitive in terms of size and power constraints.

The present invention overcomes these and other problems by incorporating a single drive coil capable of vibrating the flow tubes using a complex drive signal that may include more than one frequency.

Aspects

According to an aspect of the invention, a flow measurement system comprises:
   a vibrating flow meter including:
      at least one flow tube;
      a driver adapted to apply a biasing force on the flow tube; and
   a meter electronics configured to generate a drive signal to vibrate the flow tube about a first deflected position, wherein the first deflected position is offset from a flow tube rest position.

Preferably, the drive signal includes a voltage bias.

Preferably, the biasing force applied by the driver deflects the flow tube in a first direction.

Preferably, an inherent elasticity of the flow tube deflects the flow tube in a second direction opposite the first direction.

Preferably, the drive signal vibrates the flow tube between the rest position, the first deflected position, and a second deflected position.

Preferably, the meter electronics is further configured to generate a linearization algorithm.

Preferably, the flow tube further comprises a magnetic portion.

According to another aspect of the invention, a flow measurement system comprises:
   a vibrating flow meter, including:
      at least one flow tube;
      a driver adapted to apply a biasing force on the flow tube; and
   a meter electronics configured to generate a voltage bias and a drive signal and apply the drive signal including the voltage bias to the driver to vibrate the flow tube.

Preferably, the drive signal including the voltage bias vibrates the flow tube about a first deflected position with the first deflected position being offset from a flow tube rest position.

Preferably, the drive signal vibrates the flow tube between a rest position, a first deflected position, and a second deflected position.

Preferably, the biasing force applied by the driver deflects the flow tube in a first direction.

Preferably, an inherent elasticity of the flow tube deflects the flow tube in a second direction opposite the first direction.

Preferably, the meter electronics is further configured to generate a linearization algorithm.

Preferably, the flow tube further comprises a magnetic portion.

According to another aspect of the invention, a method for operating a vibrating flow meter including a flow tube and a driver comprises the step of:
vibrating the flow tube about a first deflected position, wherein the first deflected position is offset from a flow tube rest position.

Preferably, the step of vibrating the flow tube comprises applying a first biasing force on the flow tube with a driver based on a drive signal with an inherent elasticity of the flow tube applying a second biasing force opposite the first biasing force.

Preferably, the step of vibrating the flow tube about the first deflected position comprises vibrating the flow tube between the flow tube rest position, the first deflected position, and a second deflected position, with the first deflected position between the flow tube rest position and the second deflected position.

Preferably, the method further comprises the steps of generating a drive signal including a voltage bias and applying the drive signal to the driver to vibrate the flow tube.

Preferably, the method further comprises the step of generating a linearization algorithm for a drive signal sent to the driver.

DETAILED DESCRIPTION OF THE INVENTION

FIGS. 4-15 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
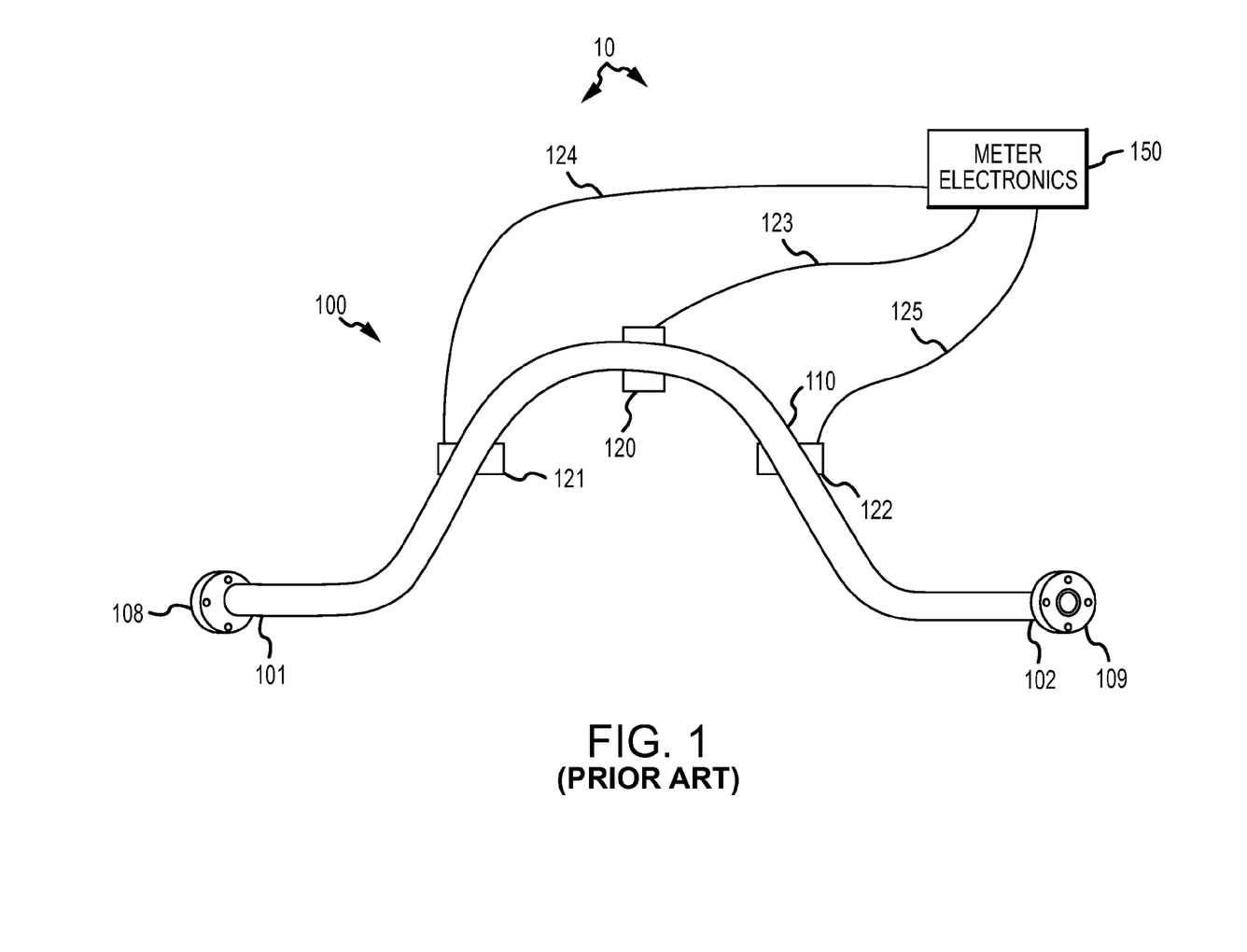
FIG. 1 shows a prior art flow measurement system.

FIG. 1 shows a prior art flow measurement system 10. The flow measurement system 10 includes a vibratory flow meter 100 and a meter electronics 150. The flow meter 100 includes a flow tube 110, a driver 120, and pick-off sensors 121, 122. The driver 120 and the pick-off sensors 121, 122 can communicate with the meter electronics 150 via leads 123, 124, 125. The meter electronics 150 can process the signals received from the sensors 121, 122 to produce flow measurement information, including but not limited to a flow rate, a density, and a meter verification.

In operation, fluid enters the inlet 101 through an inlet flange 108 and exits the flow tube 110 at the outlet 102 through an outlet flange 109. As the fluid flows through the flow tube 110, the driver 120 applies a drive signal causing the flow tube 110 to vibrate in an oscillatory manner.

Figure 2:
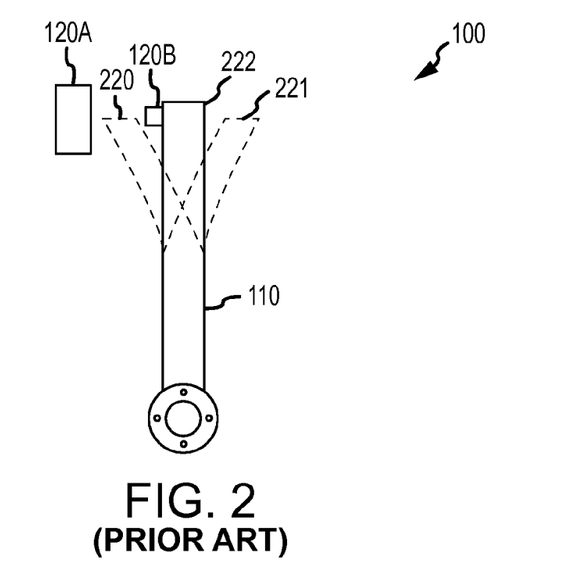
FIG. 2 shows a side view of a prior art flow meter.

FIG. 2 shows a side view of the prior art flow meter 100. As shown, the driver 120 comprises a drive coil 120A and a drive magnet 120B. The driver 120 according to the prior art flow meter 100 is capable of both attracting the flow tube 110 and repelling the flow tube 110. Therefore, the flow tube 110 may oscillate around a rest position 222 between the deflected positions as shown in the dashed lines 220 and 221. Therefore, the flow meter 100 may be driven by a simple sinusoidal drive signal 300 as shown in FIG. 3 including both positive and negative current/voltage components.

Figure 3:
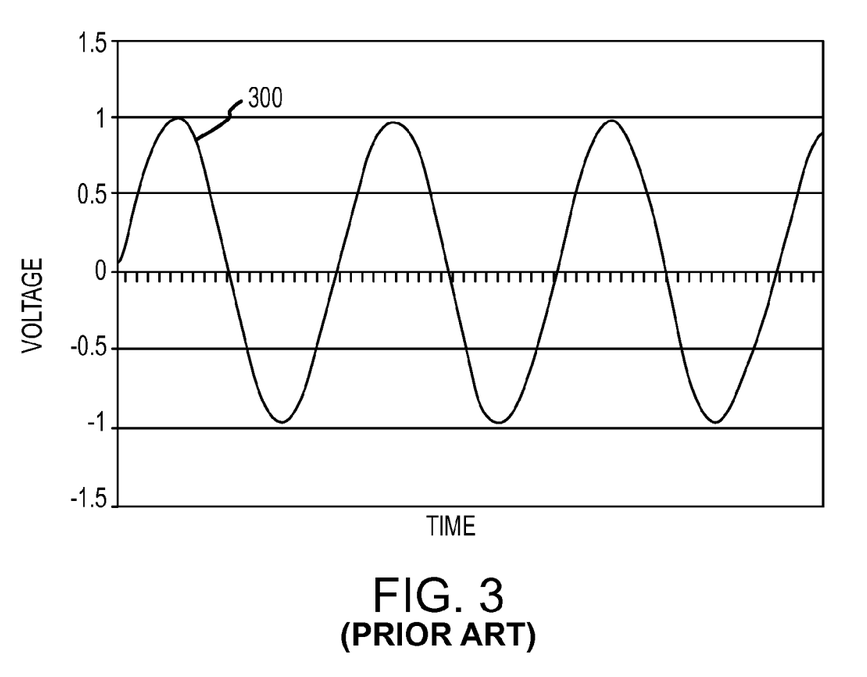
FIG. 3 shows a prior art drive signal.

FIG. 3 shows a drive signal 300 according to the prior art. The drive signal 300 is shown as a simple voltage versus time graph, where the units shown are arbitrary. The drive signal 300 comprises a simple sinusoidal drive frequency as described above where the drive signal 300 includes both a positive and a negative current/voltage component. During the positive current/voltage portion of the drive signal 300, the flow tube 110 is pushed away from the drive coil 120A as depicted at the flow tube position 221. Conversely, during the negative current/voltage portion of the drive signal 300, the flow tube 110 is attracted towards the drive coil 120A as depicted at the flow tube position 220. The drive signal 300 provides adequate results for the prior art flow meter 100 during simple operation. The drive signal 300 may be inadequate however, for flow meters that lack the ability to both attract and repel the flow tube 110 from the drive coil 120A.

Figure 4:
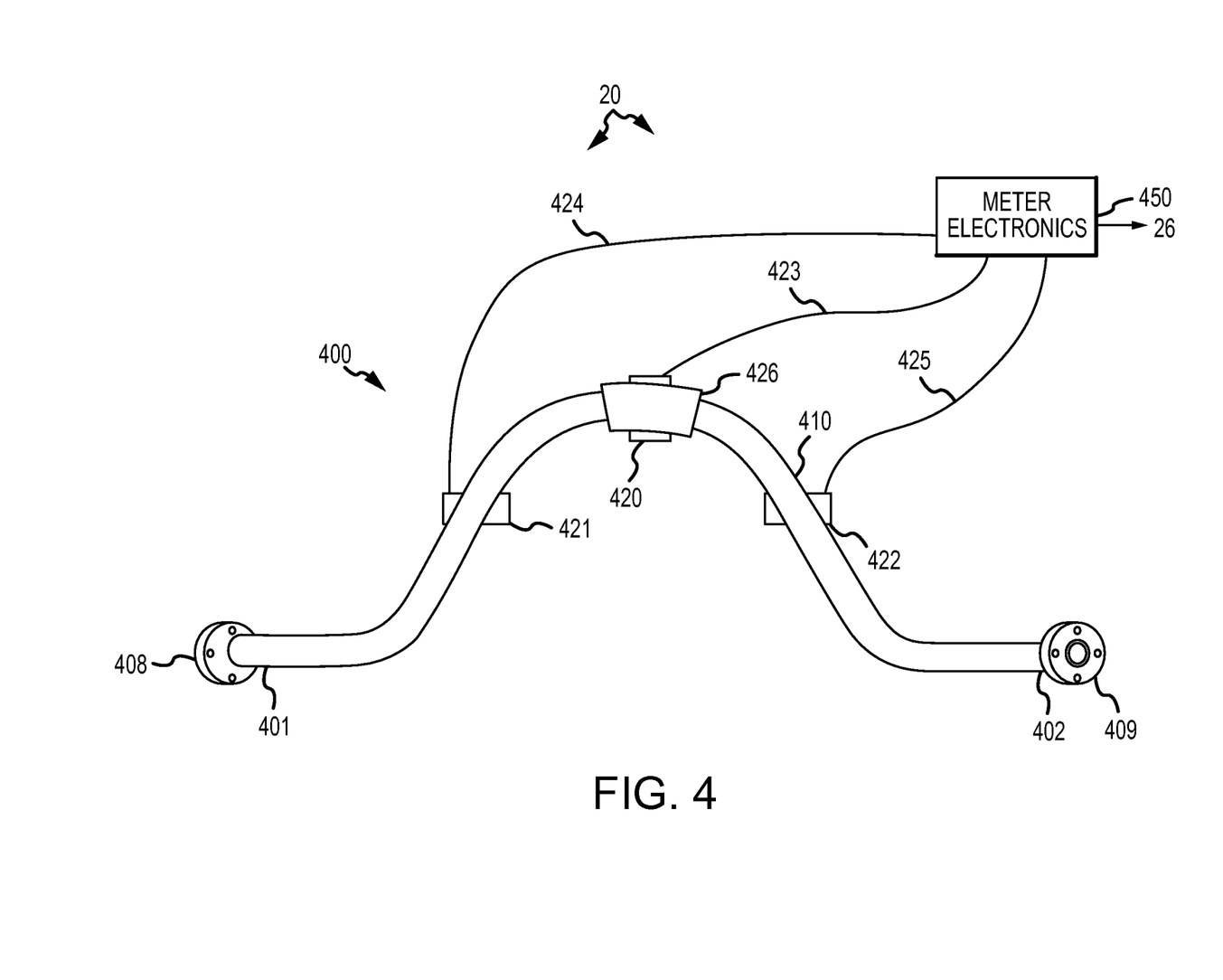
FIG. 4 shows a flow measurement system according to an embodiment of the invention.

FIG. 4 shows a flow measurement system (20) according to an embodiment of the invention. The flow measurement system (20) includes a flow meter 400 and a meter electronics 450. The flow meter 400 includes a flow tube 410, a driver 420, and pick-off sensors 421, 422. Although only a single flow tube 410 is shown, it should be understood that in other embodiments, the flow meter 400 comprises multiple flow tubes. Therefore, the present invention should not be limited to a single flow tube design. The flow meter 400 is similar to the flow meter 100 except that the flow tube 410 includes a magnetic portion 426 rather than the drive magnet 120B. According to one embodiment of the invention, the magnetic portion 426 comprises a mu-metal magnetic portion. However, it should be understood that other materials may be used and the present invention should not be limited to mu-metal materials. Furthermore, the flow meter 400 could comprise a magnet attached to the flow tube 410 similar to the flow meter 100 shown in FIG. 1. Therefore, depending on the particular material used for the magnetic portion 426, the driver 420 may only be able to drive the flow tube 410 in a single direction, i.e., pull or push the flow tube 410.

The driver 420 and the pick-off sensors 421, 422 can communicate with a meter electronics 450 via leads 423, 424, 425. Meter electronics 450 can receive the sensor signals from the first and second pick-off sensors 421, 422 via leads 424, 425, respectively. The meter electronics 450 can process the pick-off signals to compute fluid flow information. This information, along with other information, is applied by meter electronics 450 over path 26 to utilization means (not shown). The meter electronics 450 is shown in greater detail in FIG. 5.

Figure 5:
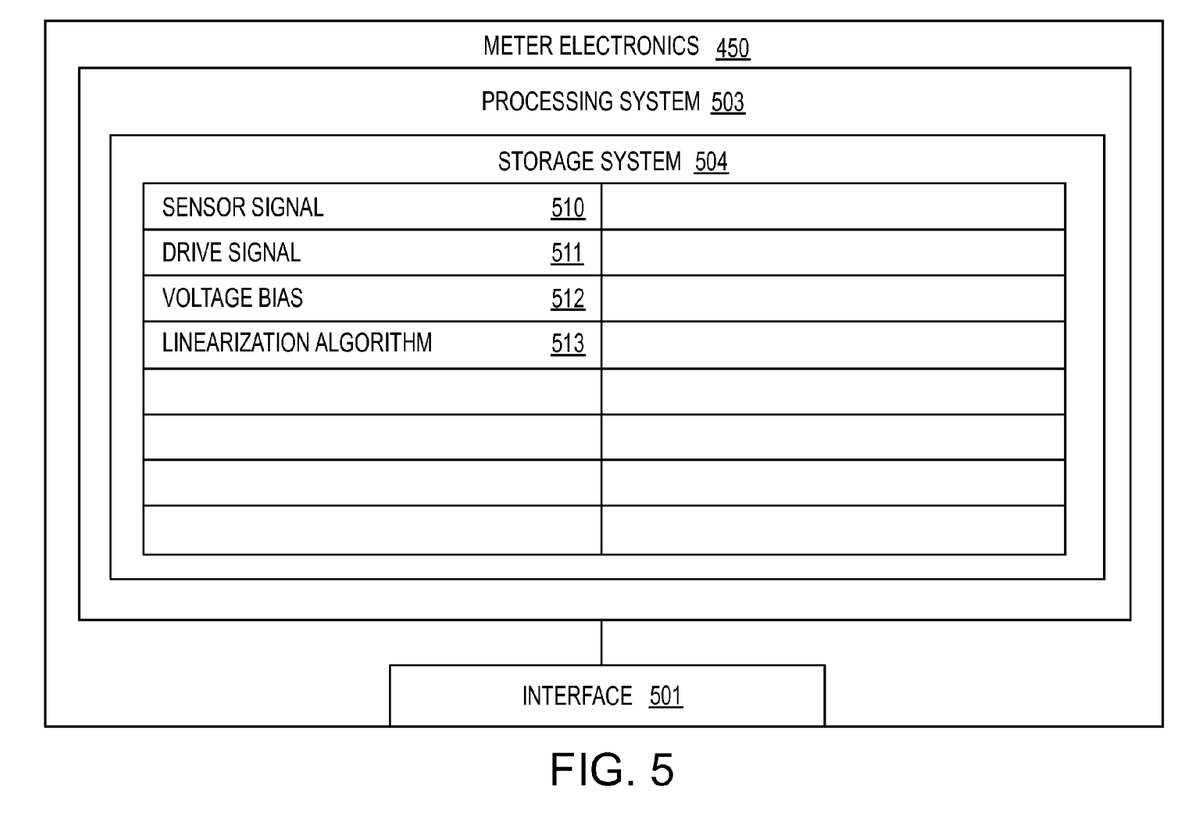
FIG. 5 shows a meter electronics according to an embodiment of the invention.

FIG. 5 shows the meter electronics 450 according to an embodiment of the invention. The meter electronics 450 can include an interface 501 and a processing system 503. The meter electronics 450 can receive sensor signals 510 from the flow meter 400, such as pick-off/velocity sensor signals. In some embodiments, the sensor signals 510 can be received from the driver 420. The meter electronics 450 can operate as a mass flow meter or can operate as a densitometer, including operating as a Coriolis flow meter. The meter electronics 450 can process the sensor signals 510 in order to obtain flow characteristics of the material flowing through the flow tube 410. For example, the meter electronics 450 can determine one or more of a phase difference, a frequency, a time difference, a density, a mass flow rate, a volume flow rate, a meter verification, etc. In addition, the meter electronics 450 can generate a drive signal 511 and supply the drive signal 511 to the driver 420. The drive signal 511 may comprise a simple drive signal, such as the drive signal 600 shown in FIG. 6, or may comprise a more advanced complex drive signal, including multiple frequencies, such as the drive signal 900 shown in FIG. 9. The particular drive signals are discussed in more detail below.

In addition, the meter electronics 450 can generate a voltage bias 512 for the drive signal 511. It should be understood that a voltage bias, such as the voltage bias 512 is meant to mean a current or voltage that is applied to the driver in addition to the drive signal to raise or lower current/voltage of the applied signal by a predetermined amount. The voltage bias 512 may comprise a DC voltage bias, for example. The voltage bias 512 may comprise a positive or a negative voltage bias. The particular voltage bias may depend on the particular magnetic material and/or driver used on the flow meter 400.

The meter electronics 450 can also generate a linearization algorithm 513. The linearization algorithm 513 may comprise curve fitting, filtering, amplifying, etc. The linearization algorithm 513 may be used to create a linear drive signal, for example. According to another embodiment of the invention, the linearization algorithm 513 may be used to provide a more linear drive signal based on an existing non-linear drive signal, i.e., increase the linearization of the drive signal. The various functions of the meter electronics 450 is discussed in more detail below.

The interface 501 can receive the sensor signals from the pick-off sensors 421, 422, or the driver 420 via leads 423-425. The interface 501 may perform any necessary or desired signal conditioning, such as any manner of formatting, amplification, buffering, etc. Alternatively, some or all of the signal conditioning can be performed in the processing system 503. In addition, the interface 501 can enable communications between the meter electronics 450 and external devices. The interface 501 can be capable of any manner of electronic, optical, or wireless communication.

The interface 501 in one embodiment can include a digitizer (not shown), wherein the sensor signal comprises an analog sensor signal. The digitizer can sample and digitize the analog sensor signal and produce a digital sensor signal. The digitizer can also perform any needed decimation, wherein the digital sensor signal is decimated in order to reduce the amount of signal processing needed and to reduce the processing time.

The processing system 503 conducts operations of the meter electronics 450 and processes flow measurements from the flow meter 400. The processing system 503 executes one or more processing routines and thereby processes the flow measurements in order to produce one or more flow characteristics.

The processing system 503 can comprise a general purpose computer, a micro-processing system, a logic circuit, or some other general purpose or customized processing device. The processing system 503 can be distributed among multiple processing devices. The processing system 503 can include any manner of integral or independent electronic storage medium, such as the storage system 504.

The processing system 503 processes the sensor signal 510 in order to generate the drive signal 511, among other things. The drive signal is supplied to the driver 420 in order to vibrate the associated flow tube(s), such as the flow tube 410 of FIG. 4. Example drive signals are provided below.

It should be understood that the meter electronics 450 may include various other components and functions that are generally known in the art. These additional features are omitted from the description and the figures for the purpose of simplicity. Therefore, the present invention should not be limited to the specific embodiments shown and discussed.

With the flow meter 400 being limited to driving the flow tube 410 in a single direction, the simple sinusoidal drive signal 300, including both positive and negative components, may not be practical. This is because, during the negative current/voltage portions of the drive signal 300, the flow tube 410 may not be attracted to the driver 120. Alternatively, if the driver 120 is able to attract the flow tube 410, but not repel the flow tube, then the positive current/voltage portions of the drive signal 300 may not be operative. Therefore, one prior art approach has been to drive the flow meter according to a square drive signal, such as shown in FIG. 6 and discussed below, for example.

Figure 6:
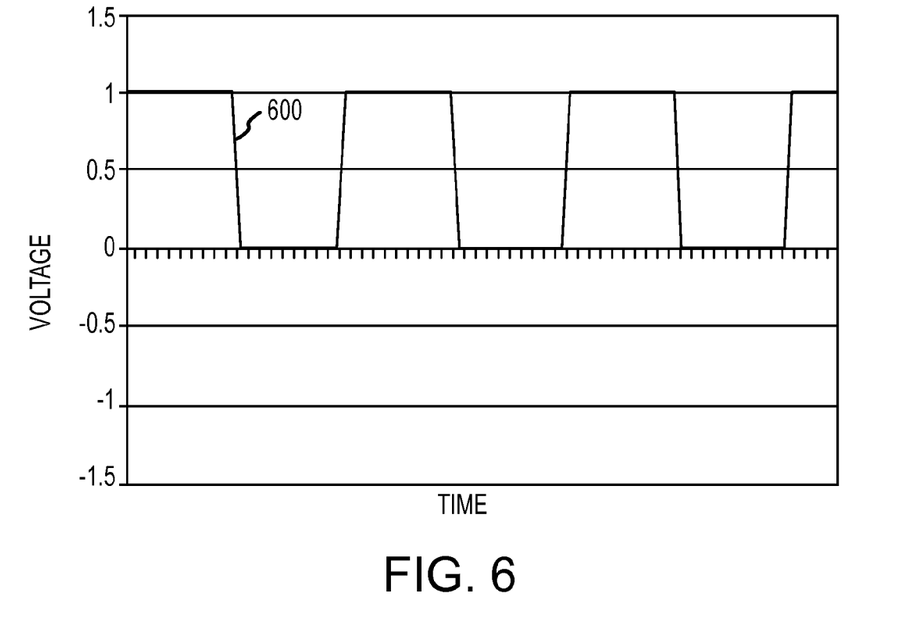
FIG. 6 shows a square drive signal according to an embodiment of the invention.

FIG. 6 shows a square drive signal 600 according to an embodiment of the invention. The square drive signal 600 comprises a single frequency component, wherein the current/voltage is positive for approximately half of the time and approximately zero for approximately half of the time. Therefore, when the meter electronics 450 provides the drive signal 600 to the driver 420, the flow tube 410 vibrates as shown in FIG. 7.

Figure 7:
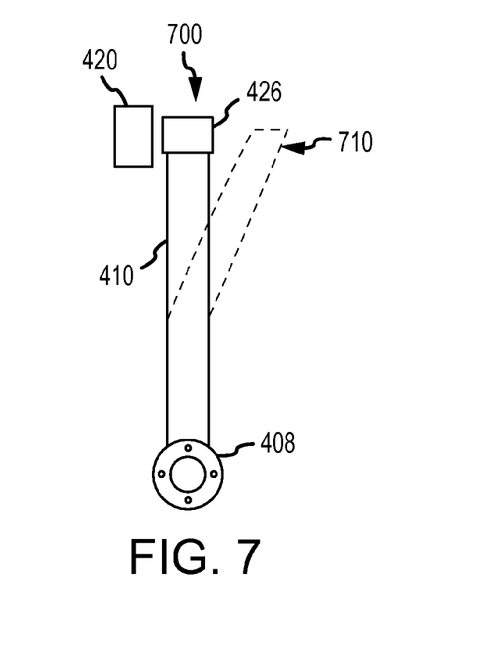
FIG. 7 shows a side view of a flow meter according to an embodiment of the invention.

FIG. 7 shows a side view of the flow meter 400 according to an embodiment of the invention. The flow tube 410 is shown in a solid line at its rest position 700. It should be understood that "rest position" is meant to imply the flow tube's position when there is substantially no biasing force provided by the driver. The dashed line 710 shows the flow tube 410 when the flow tube 410 is repelled from the driver 420, for example, when the flow meter is driven according to the square drive signal 600. When the flow meter 400 is driven according to the square drive signal 600 the magnetic portion 426 of the flow tube 410 is repelled from the driver 420 when current is provided. The elasticity of the flow tube 410 brings the flow tube 410 back to its rest position when no current is provided. It should be understood that in some embodiments, the drive signal 600 can comprise negative components rather than positive components.

The simple drive signals 300 and 600 shown in FIGS. 3 & 6 are adequate for simple measurements; however, some flow meter functions require more complex drive signals including multiple frequencies provided substantially simultaneously.

Figure 8:
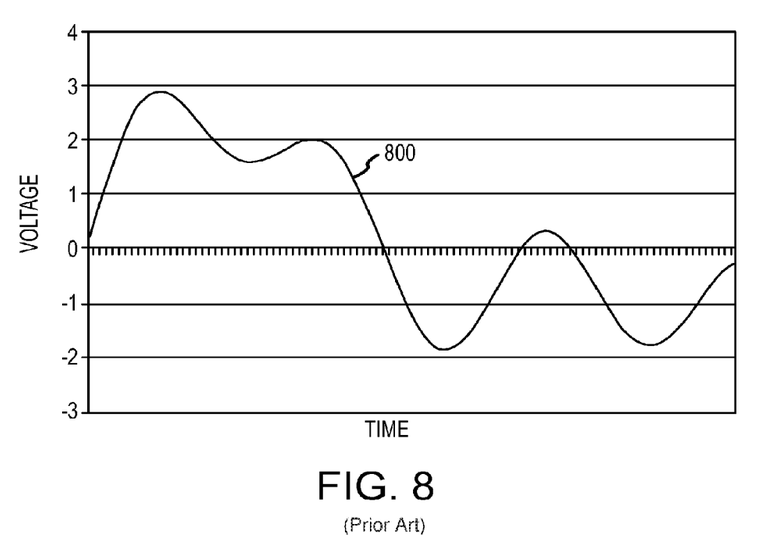
FIG. 8 shows a prior art drive signal.

FIG. 8 shows an example of an advanced drive signal 800 according to the prior art. The drive signal 800 comprises a complex signal including multiple frequencies. The drive signal 800 can be implemented where more advanced measurements are desired, for example. Although the drive signal 800 provides adequate results in flow meters where the driver is capable of push-pull mode vibrations, the drive signal 800 may not provide adequate results in flow meters only capable of unidirectional drive forces. In order to overcome the drawbacks of the drive signal 800, the present invention introduces a voltage bias to the drive signal.

According to an embodiment of the invention, the meter electronics 450 can generate a voltage bias 512. Although the discussion below is limited to the situation where the voltage bias 512 is applied to the drive signal 800, it should be appreciated that the voltage bias 512 may be applied to any drive signal and the present invention should not be limited to the specific drive signals discussed. It should also be appreciated that the voltage bias may be implemented in embodiments where the driver is capable of push-pull mode vibrations. Therefore, although the discussion below refers primarily to situations where the driver operates in either pull only or push only modes, the present invention should not be limited to these situations. The drive signal 800, including the voltage bias 512, can be applied to the flow tube 410. The resulting drive signal 900 is shown in FIG. 9.

Figure 9:
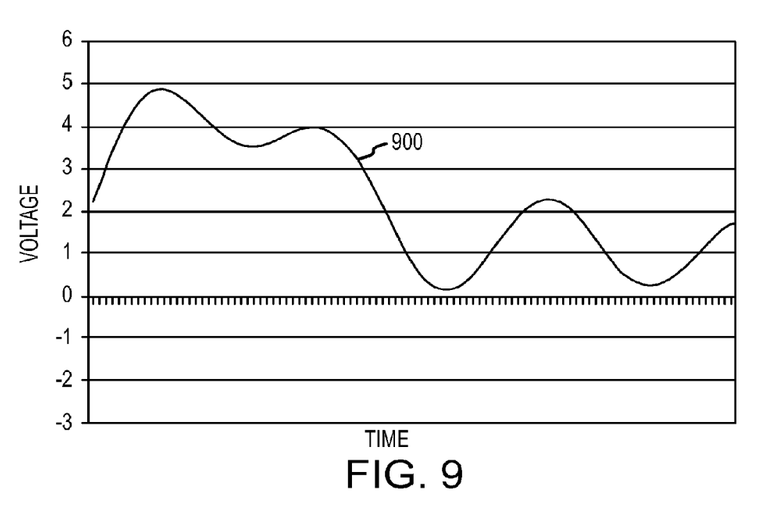
FIG. 9 shows a drive signal according to an embodiment of the invention.

FIG. 9 shows a drive signal 900 according to an embodiment of the invention. As shown, the drive signal 900 is similar to the drive signal 800 except that the drive signal 900 according to an embodiment of the invention includes a voltage bias. This results in substantially the entire drive signal being positive. In other words, current/voltage is supplied to the driver 420 during substantially the entire drive signal 900. This is unlike the drive signal 600 of the prior art where current is alternately turned on and off resulting in periods where the flow tube 410 returns to its rest position. Rather, according to an embodiment of the invention, the flow tube 410 oscillates around a first deflected position 1002. The first deflected position 1002 can reside between the rest position 1001 and a second deflected position 1003 of the flow tube 410. The flow tube deflection occurring as a result of the drive signal 900 is shown in FIG. 10.

Figure 10:
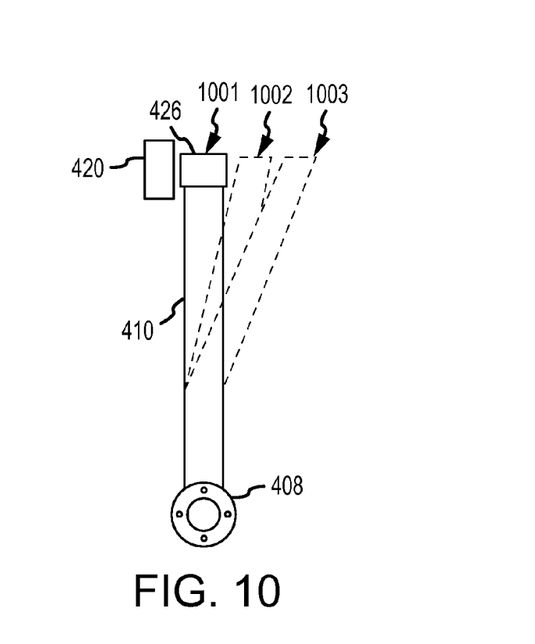
FIG. 10 shows a side view of a flow meter according to an embodiment of the invention.

FIG. 10 shows a side view of the flow meter 400 according to an embodiment of the invention. According to the embodiment shown, in response to the drive signal 900 sent by the meter electronics 450 to the driver 420, the flow tube 410 oscillates between a rest position 1001, a first deflected position 1002, and a second deflected position 1003. According to the embodiment shown in FIG. 10, the flow tube 410 oscillates about the first deflected position 1002. According to the embodiment shown, the first deflected position 1002 is offset from the rest position 1001. Therefore, even in embodiments where the driver 420 can only deflect the flow tube 410 in a single direction, the flow tube 410 can still oscillate about the first deflected position 1002. This is because the driver 420 can deflect the flow tube 410 beyond the first deflected position 1002 to the second deflected position 1003 and the flow tube's inherent elasticity can bring the flow tube 410 back towards the rest position 1001 on the other side of the first deflected position 1002. According to an embodiment of the invention, the flow tube 410 is driven using an advanced drive signal, such as the drive signal 900 including the voltage bias. According to an embodiment of the invention, the first deflected position is approximately at the mid-point of the flow tube's oscillation.

In the prior art flow meters where the driver was capable of biasing the flow tube in only a single direction, the flow meter relied upon the inherent elasticity of the flow tube to oscillate between the flow tube's rest position and a first deflected position. This type of configuration is shown in FIG. 7, for example.

The drive signal 900 according to an embodiment of the invention, also utilizes the flow tube's inherent elasticity. However, rather than driving the flow tube 410 between a rest position and a first deflected position, the flow tube 410 is driven between a rest position 1001, a first deflected position 1002, and a second deflected position 1003. This results in the flow meter 400 vibrating as if the flow tube 410 were driven in a bidirectional mode. However, rather than deflecting the flow tube 410 and then attracting the flow tube 410, the flow meter 400 according to an embodiment of the invention, deflects the flow tube 410 to a first deflected position 1002 and deflects the flow tube 410 even further to a second deflected position 1002. According to the embodiment shown, the first deflected position 1002 and the second deflected position 1003 are deflected away from the rest position 1001 in the same direction. In some embodiments, the second deflected position 1003 is further away from the rest position 1001 than the first deflected position 1002. Therefore, rather than the mid-point of oscillation being the rest state as in the prior art, the mid-point of oscillation is the first deflected position 1002. In other words, the flow tube 410 oscillates about the first deflected position 1002. It should be appreciated that the first deflected position 1002 may not comprise the exact mid-point of oscillation, but rather, the drive signal 900 is such that the flow tube 410 oscillates on either side of the first deflected position 1002 rather than oscillating on either side of the rest position 1001 as in prior art flow meters. Furthermore, it should be appreciated that the location of the first deflected position 1002 may change throughout the drive signal. The location may change for a number of reasons including a change in the current/voltage of the drive signal, for example. However, even if the location of the first deflected position 1002 does change, it will still reside offset from the flow tube rest position 1001.

Figure 11:
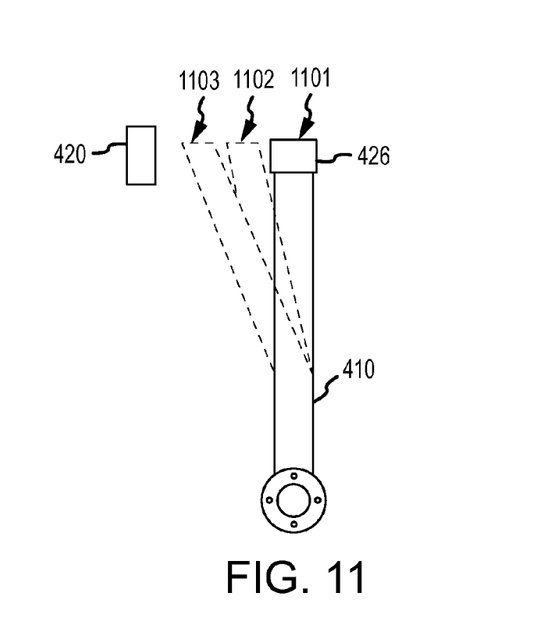
FIG. 11 shows a side view of the flow meter according to another embodiment of the invention.

FIG. 11 shows a side view of the flow meter 400 according to another embodiment of the invention. The discussion above has addressed the situation where the driver 420 is only capable of repelling the flow tube 410 away from the driver 420. However, in some embodiments, the magnetic material coupled to the flow tube 410 may be instead attracted to the driver 420. Therefore, according to an embodiment of the invention, the flow tube 410 can be deflected as shown in FIG. 11.

The flow tube oscillation shown in FIG. 11 is similar to the flow tube oscillation shown in FIG. 10, except that the flow tube 410 is attracted towards the driver 420 rather than being repelled away from the driver 420. Therefore, unlike the drive signal 900 where substantially the entire drive signal is shown as being positive, the flow tube oscillation shown in FIG. 11 would result from a drive signal where substantially the entire drive signal comprises a negative current/voltage. Therefore, the voltage bias would be a negative voltage bias. According to an embodiment of the invention, the flow tube 410 can oscillate around a first deflected position 1102. Based on the drive signal used, the flow tube 410 can be driven to a second deflected position 1103 when the drive signal is at a maximum. When the drive signal is at a minimum, the flow tube 410 can return to the rest position 1101 or nearly the rest position 1101. It should be understood that if the drive signal is not completely removed, such as according to the drive signal 900, the flow tube 410 may not return completely to the rest position 1101.

It should be understood that while the discussion above is restricted to the drive signal 900 including a voltage bias, a similar voltage bias may be applied to any of the previously discussed drive signals. For example, the voltage bias may be provided to the simple sinusoidal or square drive signals of FIGS. 3 and 6, respectively. Furthermore, it should be understood that the drive signals shown are merely examples and various other drive signals are contemplated and within the scope of the present invention. The voltage bias as discussed above may also be utilized with drivers capable of push-pull mode vibrations. Although the drive signal including the voltage bias utilizing a push-pull mode drive may be entirely positive or negative, the drive signal may include both positive and negative components. Therefore, as the flow tube 410 vibrates about the first deflected position 1002, the flow tube 410 may still cross the flow tube's rest position 1001 during the drive signal's positive or negative component.

The drive signal 900 including the voltage bias provides a signal, which deflects the flow tube 410 in a single direction and uses the inherent flow tube elasticity to deflect the flow tube 410 in the opposite direction, thereby creating an oscillation that represents a bidirectional drive signal. Therefore, the drive signal 900 may be utilized in flow meters, such as the flow meter 400 where the driver is only capable of deflecting the flow tube in one direction and still realize the measurement capabilities of complex, multiple frequency drive signals. The present invention, however, can also correct for the non-linearities that may result from the advanced drive signal 900.

Although there are various sources for the non-linearities in the drive signal, according to an embodiment of the invention, one source of non-linearity in the drive signal is due to the distance between the driver 420 and the flow tube 410. In prior art flow meters, such as the flow meter 100, the coil/magnet assembly of the driver 120 is such that there is very little space between the coil 120A and the magnet 120B. If the force on the magnet 120B exerted by a fixed current/voltage in the coil versus the distance the magnet is from the coil is plotted, a graph such as shown in FIG. 12 can be generated.

Figure 12:
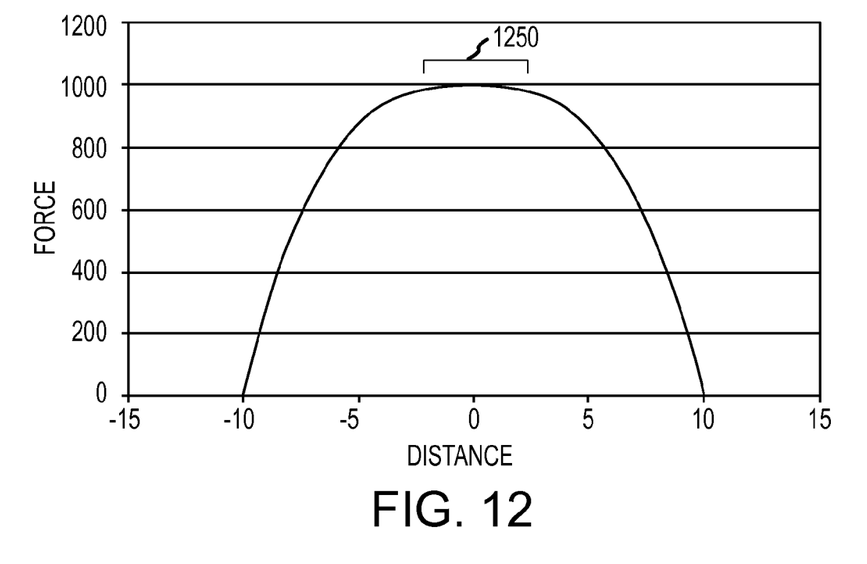
FIG. 12 is a graph showing the relationship between the force experienced by a flow tube and the distance the flow tube is from the driver.

FIG. 12 shows the relationship between the force experienced by the magnet 120B or alternatively, the flow tube 410 by the coil 120A or the driver 420. As can be seen, the force is nearly linear within a short distance 1250 of the coil/driver. The prior art flow meter 100 is designed to operate in this nearly linear region 1250.

However, with a single-driver 420 and the magnetic portion 426 of the flow meter 400, the driver 420 is relatively far from the flow tube 410 in order to oscillate around the first deflected position 1002 rather than the rest position 1001. Thus, the flow meter 400 operates mainly in the region 1350 shown in FIG. 13.

Figure 13:
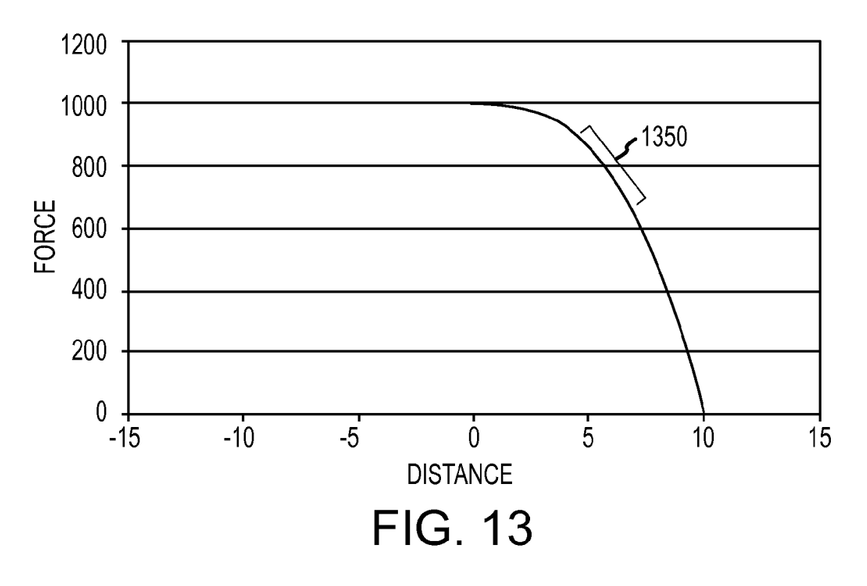
FIG. 13 is a graph showing the relationship between the force experienced by the flow tube and the distance the flow tube is from the driver.

FIG. 13 shows the relationship between the force experienced by the flow tube 410 and the distance the flow tube 410 is from the driver 420. Only the positive distance is shown for situations where the driver 420 can only repel the flow tube 410. It should be appreciated that a similar graph could be constructed for situations where the driver 420 can only attract the flow tube 410.

As can be seen, the region 1350 is generally further away from the driver 420 than the region 1250 shown in FIG. 12. This results in a generally non-linear drive signal 900 because the resulting force does not linearly follow the drive signal. This is because as the flow tube is deflected from the first deflected position 1002 to the second deflected position 1003, the distance changes a relatively large amount even when the force applied remains constant. This non-linearity is shown in FIG. 14.

Figure 14:
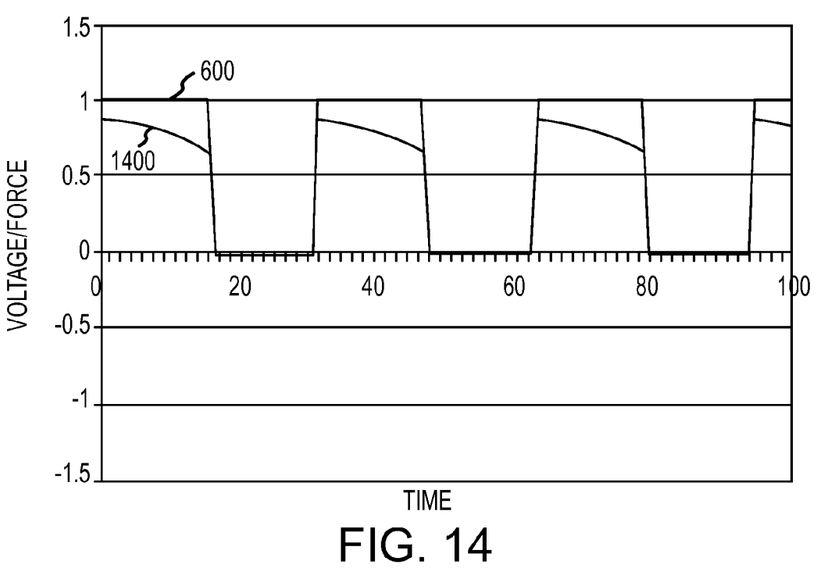
FIG. 14 shows a drive signal along with the force experienced by the flow tube.

FIG. 14 shows the drive signal 600 along with the actual force 1400 experienced by the flow tube 410. At the beginning of each cycle, the flow tube 410 is in its rest position 700. This is the position where the driver 420 is closest to the flow tube 410 and thus, the magnetic portion 426. Therefore, the force 1400 is the greatest at the rest position 700. As the driver 420 deflects the flow tube 410 away, the force applied against the coil is reduced. As can be seen in FIG. 14, the force 1400 drops significantly prior to the current/voltage of the driver 420 being turned off. This type of distortion may not have a significant effect on standard measurements such as mass flow and density, which are based on phase and frequency. However, other measurements may be negatively affected by such a non-linear trend. Therefore, the effect on other drive signals, such as the drive signal 900 may result in significant errors.

Figure 15:
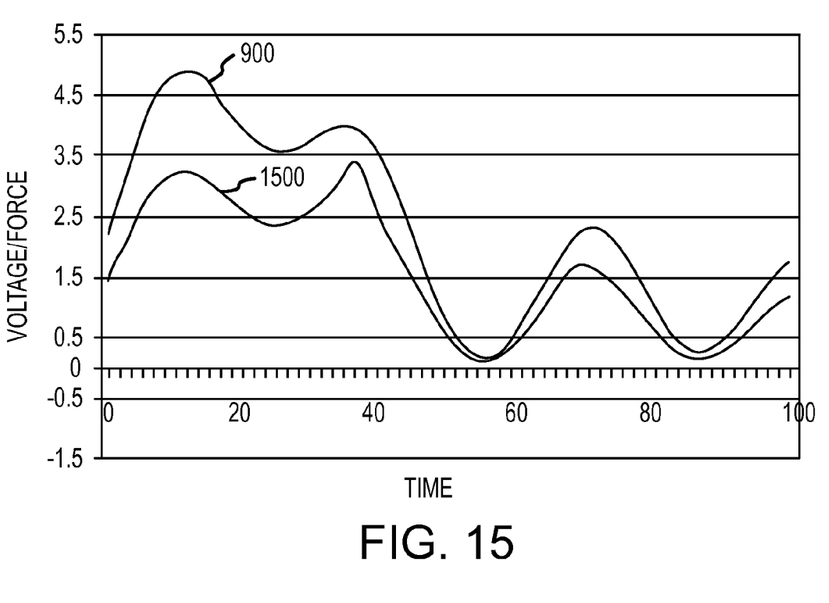
FIG. 15 shows another drive signal along with the force experienced by the flow tube.

FIG. 15 shows the drive signal 900 along with the force 1500 experienced by the flow tube 410. As can be seen, the force 1500 applied to the flow tube 410 is clearly not linear with the current/voltage signal 900. The present invention can correct for the non-linearities realized by the flow meter 400. The correction may be in either hardware or software. Circuitry or digital signal processing algorithms can characterize the force versus distance curve shown in FIG. 13, for example. Therefore, curve fitting the graph shown in FIG. 15 can be used to obtain a more linear drive signal.

According to an embodiment of the invention, the force experienced by the flow tube 410 can be plotted against the drive signal. The difference can be corrected by curve fitting the resulting force with the drive signal. Thus, the non-linearities due to the increased distance between the drive coil and the flow tube 410 can be corrected using various hardware and/or software correction algorithms.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other flow meters, and not just to the embodiments described above and shown in the accompanying figures. Accordingly, the scope of the invention should be determined from the following claims.

We claim:

1. A flow measurement system (20), comprising:
a vibrating flow meter (400), including:
at least one flow tube (410);
a driver (420) adapted to apply a biasing force on the flow tube (410); and
a meter electronics (450) configured to generate a drive signal to vibrate the flow tube (410) about a first deflected position (1002), between a rest position, the first deflected position, and a second deflected position, wherein the first deflected position (1002) is offset from a flow tube rest position (1001) and the first deflected position is between the flow tube rest position and the second deflected position.

2. The flow measurement system (20) of claim 1, wherein the drive signal includes a voltage bias.

3. The flow measurement system (20) of claim 1, wherein the biasing force applied by the driver (420) deflects the flow tube (410) in a first direction.

4. The flow measurement system (20) of claim 3, wherein an inherent elasticity of the flow tube (410) deflects the flow tube (410) in a second direction opposite the first direction.

5. The flow measurement system (20) of claim 1, wherein the meter electronics (450) is further configured to generate a linearization algorithm (513).

6. The flow measurement system (20) of claim 1, wherein the flow tube (410) further comprises a magnetic portion (426).

7. A flow measurement system (20), comprising:
a vibrating flow meter (400), including:
at least one flow tube (410);
a driver (420) adapted to apply a biasing force on the flow tube (410); and
a meter electronics (450) configured to generate a drive signal including a voltage bias and apply the drive signal including the voltage bias to the driver (420) to vibrate the flow tube (410), wherein the drive signal including the voltage bias vibrates the flow tube between a rest position, a first deflected position, and a second deflected position, wherein the first deflected position is between the flow tube rest position and the second deflected position.

8. The flow measurement system (20) of claim 7, wherein the drive signal including the voltage bias vibrates the flow tube (410) about the first deflected position (1002), with the first deflected position (1002) being offset from the flow tube rest position (1001).

9. The flow measurement system (7) of claim 8, wherein the biasing force applied by the driver (420) deflects the flow tube (410) in a first direction.

10. The flow measurement system (20) of claim 9, wherein an inherent elasticity of the flow tube (410) deflects the flow tube (410) in a second direction opposite the first direction.

11. The flow measurement system (20) of claim 7, wherein the meter electronics (450) is further configured to generate a linearization algorithm (513).

12. The flow measurement system (20) of claim 7, wherein the flow tube (410) further comprises a magnetic portion (426).

13. A method for operating a vibrating flow meter including a flow tube and a driver, comprising a step of:
vibrating the flow tube between a rest position, the first deflected position, and a second deflected position, with the first deflected position being between the flow tube rest position and the second deflected position, wherein the first deflected position is offset from a flow tube rest position.

14. The method of claim 13, wherein the step of vibrating the flow tube comprises applying a first biasing force on the flow tube with a driver based on a drive signal with an inherent elasticity of the flow tube applying a second biasing force opposite the first biasing force.

15. The method of claim 13, further comprising steps of generating a drive signal including a voltage bias and applying the drive signal to the driver to vibrate the flow tube.

16. The method of claim 13, further comprising a step of generating a linearization algorithm for a drive signal sent to the driver.

* * * * *